(12) United States Patent
Takaichi et al.

(10) Patent No.: US 8,747,583 B2
(45) Date of Patent: Jun. 10, 2014

(54) MANUFACTURING DEVICE FOR PERMANENT MAGNET DISPOSED IN ROTATING ELECTRICAL MACHINE AND MANUFACTURING METHOD OF THE SAME

(75) Inventors: Kazuhiro Takaichi, Tokyo (JP); Kunitomo Ishiguro, Odawara (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 0 days.

(21) Appl. No.: 13/703,823

(22) PCT Filed: Jun. 8, 2011

(86) PCT No.: PCT/JP2011/063114
§ 371 (c)(1),
(2), (4) Date: Dec. 12, 2012

(87) PCT Pub. No.: WO2011/158710
PCT Pub. Date: Dec. 22, 2011

(65) Prior Publication Data
US 2013/0087265 A1 Apr. 11, 2013

(30) Foreign Application Priority Data
Jun. 17, 2010 (JP) .................................. 2010-138253

(51) Int. Cl.
*H01F 41/02* (2006.01)

(52) U.S. Cl.
USPC ... 156/60; 156/580; 310/156.43; 310/156.45; 310/156.53; 310/156.38; 29/598; 29/607; 29/608; 29/596

(58) Field of Classification Search
CPC ....... H02K 15/03; H01F 41/0253; H01F 1/08; H01F 7/02
USPC .................. 156/60, 580; 310/156.43, 156.45, 310/156.53, 156.38; 29/608, 596, 598, 607
See application file for complete search history.

(56) References Cited

U.S. PATENT DOCUMENTS 8,497,613 B2 * 7/2013 Nakamura et al. ....... 310/156.38
2010/0244608 A1 9/2010 Nakamura et al.

FOREIGN PATENT DOCUMENTS

JP 2004-328927 A 11/2004
JP 2009-142081 A 6/2009

* cited by examiner

*Primary Examiner* — Daniel McNally
*Assistant Examiner* — Margaret Squalls
(74) *Attorney, Agent, or Firm* — Foley & Lardner LLP

(57) ABSTRACT

This invention is a manufacturing device for a permanent magnet disposed in a rotating electrical machine, in which a plurality of magnet pieces, each formed by being fractured and split along a notch groove, are aligned and joined to each other with an adhesive interposed between fractured surfaces. First pressing means for aligning the plurality of fractured and split magnet pieces with the fractured surfaces opposed to each other in a width direction by pressing from the width direction of the permanent magnet and second pressing means for aligning the plurality of magnet pieces in a thickness direction by pressing from a thickness direction of the permanent magnet are provided. Moreover, third pressing means for joining the opposing fractured surfaces of the magnet piece with the interposed adhesive by pressing the plurality of magnet pieces from a longitudinal direction of the permanent magnet is provided.

2 Claims, 12 Drawing Sheets

MANUFACTURING DEVICE FOR PERMANENT MAGNET DISPOSED IN ROTATING ELECTRICAL MACHINE AND MANUFACTURING METHOD OF THE SAME

TECHNICAL FIELD

The present invention relates to a manufacturing device for a permanent magnet disposed in a rotating electrical machine and a manufacturing method of the same.

BACKGROUND ART

A technology for using a permanent magnet formed by cleaving and splitting so as to reduce a surface area in a rotor core of a rotating electrical machine is known. By forming the permanent magnet as above, an eddy current generated by fluctuation in a magnetic field is reduced. Then, heat generation of the permanent magnet caused by the eddy current is suppressed. As a result, irreversible thermal demagnetization can be prevented.

A method of cleaving a permanent magnet is described in JP2009-142081A. In this JP2009-142081A, the inside of a container having an inside hollow dimension and an inside hollow shape equal to a dimension and a shape of a rotor slot is used. First, a resin is filled in this container. Subsequently, a permanent magnet provided in advance with a notch which becomes a target of cleaving is inserted. Then, the permanent magnet is cleft in the container into magnet pieces. By cleaving the permanent magnet as above, the resin is infiltrated between the magnet pieces.

SUMMARY OF INVENTION

However, with the configuration described in JP2009-142081A, the permanent magnet is cleft in the container and the magnet pieces are integrated by the resin in that state. Thus, shifts are generated between the magnet pieces in a thickness direction, a width direction, and a length direction. Considering generation of such shifts, a magnet dimension is restricted. As a result, motor performances are also restricted.

Therefore, the present invention has an object to provide a manufacturing device for a permanent magnet disposed in a rotating electrical machine suitable for ensuring a magnet dimension and a manufacturing method of the same.

In order to achieve the above object, the present invention is a manufacturing device for a permanent magnet disposed in a rotating electric machine, in which a plurality of magnet pieces, each formed by fracture and split along a notch groove, are aligned and joined to each other by interposing an adhesive between fractured surfaces. The present invention is provided with first pressing means for pressing the plurality of magnet pieces fractured and split with the fractured surfaces opposed to each other from a width direction of the permanent magnet and by aligning them in the width direction, and second pressing means for pressing the plurality of magnet pieces from a thickness direction of the permanent magnet and by aligning them in the thickness direction. Moreover, third pressing means for pressing the plurality of magnet pieces from a longitudinal direction of the permanent magnet and joining the opposing fractured surfaces of the magnet pieces to each other with the interposed adhesive is provided.

The details and other characteristics and merits of this invention will be explained in the description below and illustrated in the attached drawings.

DESCRIPTION OF EMBODIMENTS

A manufacturing device for a permanent magnet disposed in a rotating electrical machine and a manufacturing method for the same of the present invention will be described below on the basis of each of the embodiments.

(First Embodiment)

Figure 1:
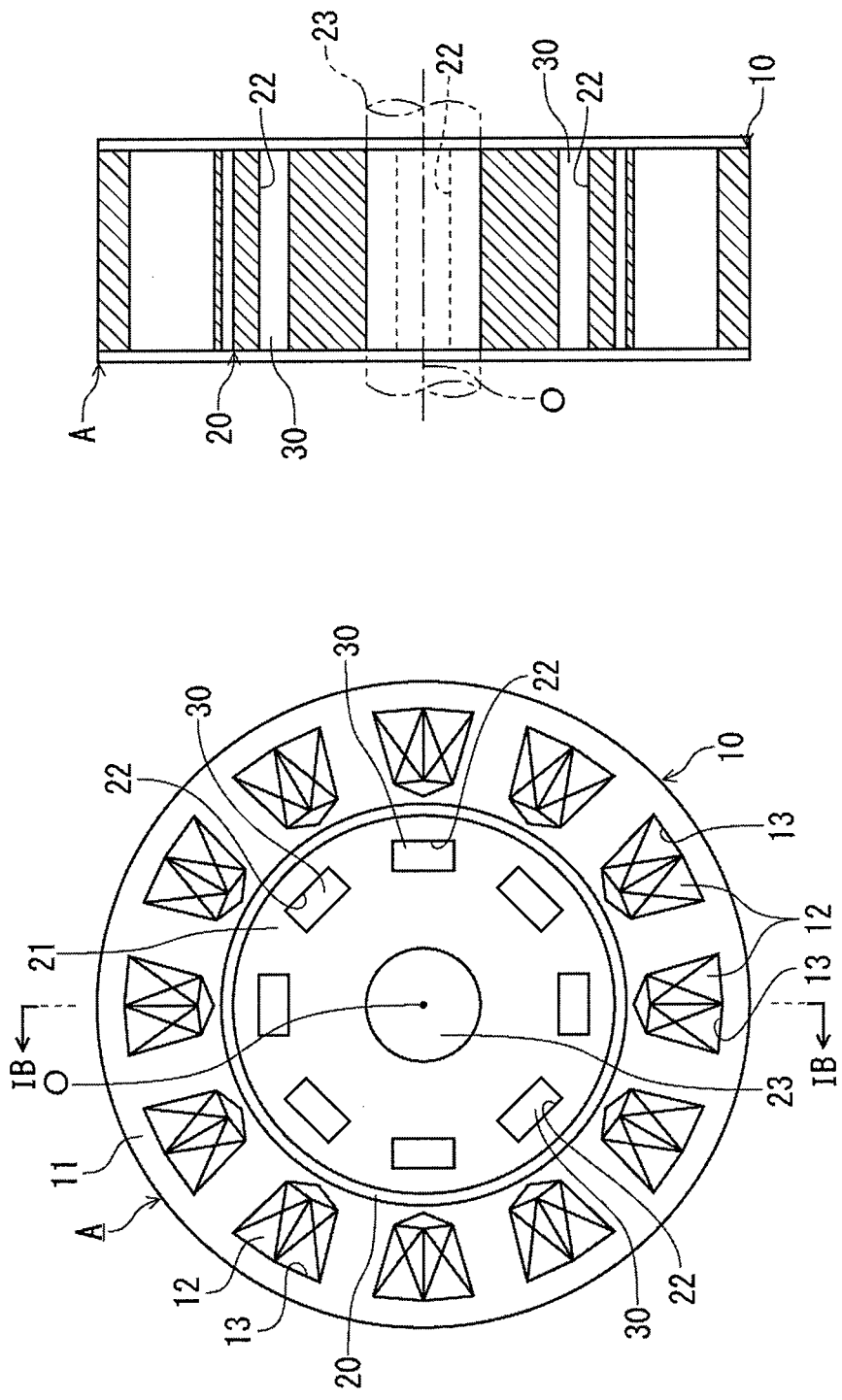
FIG. 1A is a front view illustrating an outline configuration of a rotating electrical machine to which a permanent magnet according to an embodiment of the present invention is applied.
FIG. 1B is a sectional view along IB-IB line in FIG. 1A.

FIG. 1A is a front view illustrating an outline configuration of a rotating electrical machine to which a permanent magnet according to an embodiment of the present invention is applied. FIG. 1B is a sectional view along IB-IB line in FIG. 1A.

A permanent-magnet embedded rotating electrical machine A (hereinafter referred to simply as a "rotating electrical machine") is formed of an annular stator 10 constituting a part of a casing, not shown, and a columnar rotor 20 arranged coaxially with this stator 10.

The stator 10 includes a stator core 11 and a plurality of coils 12. In the stator core 11, slots 13 are formed at equiangular intervals on the same circumference having a shaft center O at the center. The plurality of coils 12 are accommodated in the slots 13 formed in the stator core 11.

The rotor 20 includes a rotor core 21, a rotating shaft 23 rotating integrally with the rotor core 21, and a plurality of permanent magnets 30. In the rotor core 21, slots 22 are formed at equiangular intervals on the same circumference having the shaft center O at the center. The plurality of permanent magnets 30 are accommodated in the slots 22 formed in the rotor core 21.

Figure 2:
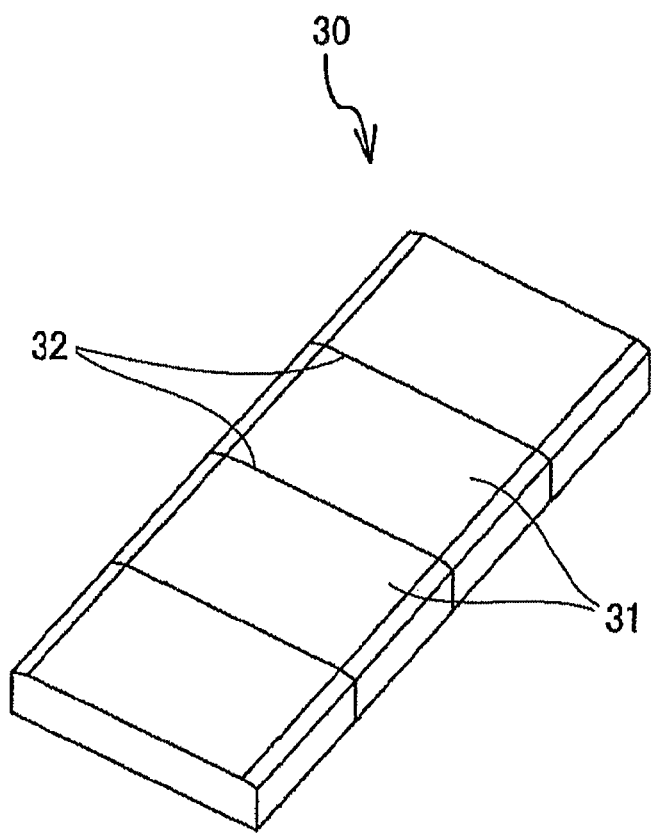
FIG. 2 is a perspective view of the permanent magnet.

The permanent magnet 30 accommodated in the slot 22 is, as illustrated in FIG. 2, formed as a collection of magnet pieces 31 aligned in a row by bonding the plurality of magnet pieces 31 formed by fracturing and splitting the permanent magnet 30 with each other on fractured surfaces by a resin. The resin used is provided with heat resistance performances of approximately 200° C., for example, and electrically insulates the adjacent magnet pieces 31 from each other. As a result, since an eddy current generated by fluctuation in an acting magnetic field remains in each of the magnet pieces 31 and is reduced, heat generation of the permanent magnet 30 caused by the eddy current is suppressed, and irreversible thermal demagnetization can be prevented.

As a method of bonding and integrating the plurality of split and fractured magnet pieces 31 by a resin, a method of cleaving the permanent magnet in the container and integrating the magnet pieces by a resin in that state is known. With this method, since the magnet pieces are bonded by the resin in a state where shifts are generated between the magnet pieces in a thickness direction, a width direction, and a length direction, there is a problem that a magnet dimension cannot be taken large by allowing for the shifts and motor performances are deteriorated.

Figure 3:
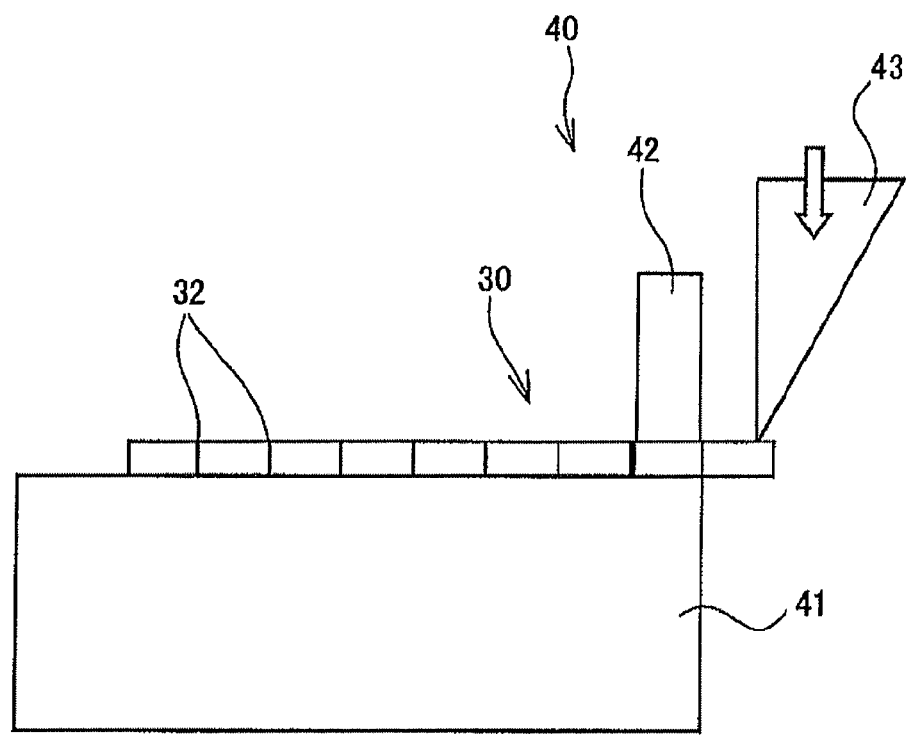
FIG. 3 is a conceptual diagram illustrating a configuration of a magnet splitting jig for fracturing the permanent magnet.
Figure 4A:
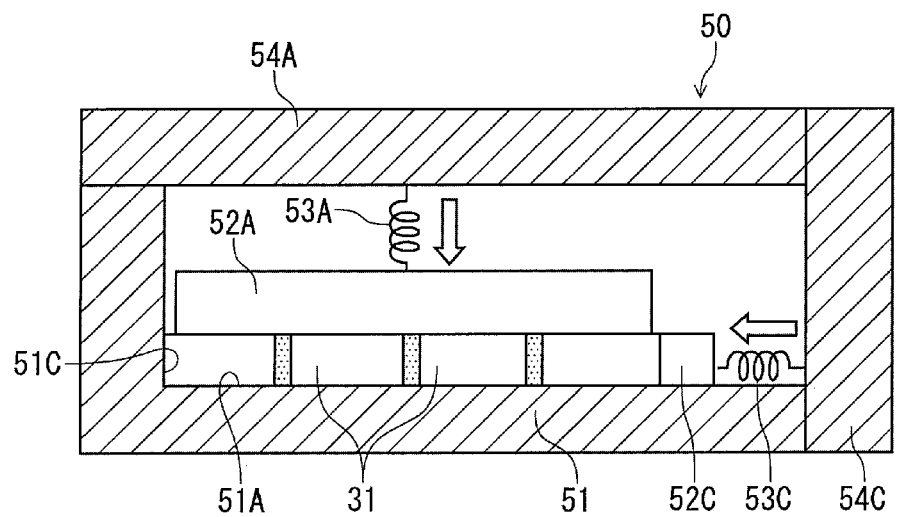
FIG. 4A is a cross sectional diagram illustrating a configuration of an integrating jig of a first embodiment.
Figure 4B:
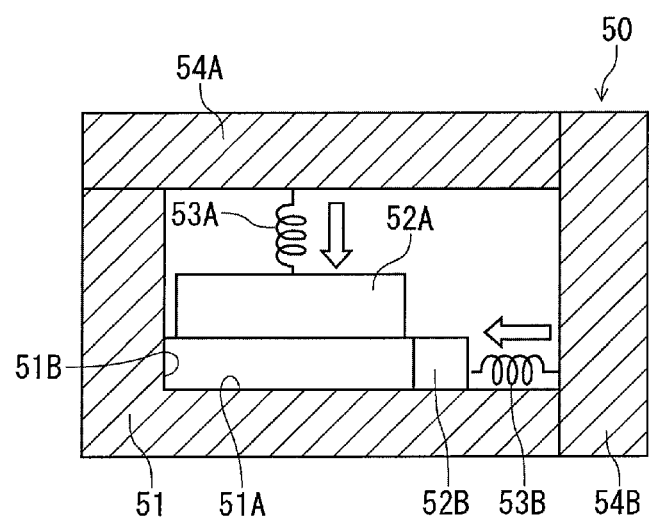
FIG. 4B is a longitudinal sectional diagram illustrating a configuration of the integrating jig of the first embodiment.

Thus, in this embodiment, a manufacturing device for a permanent magnet 30 and a manufacturing method are provided in which, when the magnet pieces are to be joined with an adhesive, the cleft magnet pieces are aligned by being pressed in three direction, that is, the thickness direction, the width direction, and the longitudinal direction of the permanent magnet so as to suppress the shifts and by integrating the magnet pieces in that state. FIG. 3 illustrates a configuration of a magnet splitting jig which cleaves the permanent magnet, and FIGS. 4A and 4B illustrate a configuration of a first embodiment of an integrating jig which aligns and integrates the plurality of cleft magnet pieces.

The magnet splitting jig 40 includes a die 41 on which the permanent magnet 30 is placed, a magnet fixing jig 42 for fixing the permanent magnet 30 at an end portion of the die 41, and a punch 43 for fracturing the permanent magnet 30 by pushing in a protruding portion of the permanent magnet 30 from the die 41.

In the permanent magnet 30, a groove 32 is provided at a desired position to be fractured. The groove 32 may be formed by mechanical cutting or may be formed by laser machining or wire cut discharge machining, for example.

The magnet fixing jig 42 is a jig for fixing the permanent magnet 30 by pressing the same toward the die 41 and presses the permanent magnet 30 by bolt tightening or a hydraulic pressure. The punch 43 fractures the permanent magnet 30 along the groove 32 of the permanent magnet 30 by pressing the portion of the permanent magnet 30 protruding from the die 41 downward. The punch 43 is driven by a servo press, a mechanical press, a hydraulic press and the like, for example.

The permanent magnet 30 in which the groove 32 is provided is placed on the upper surface of the die 41 and is fixed by the magnet fixing jig 42 in a state where the permanent magnet protrudes from the right end of the die 41 by a length of one magnet piece 31. By lowering the punch 43, the permanent magnet 30 is fractured along the groove 32. By repeating this operation, the permanent magnet 30 is cleft into a plurality of the magnet pieces 31.

A quantity (here, it is assumed to be four) set in advance of the cleft magnet pieces 31 are applied with an adhesive on the opposing fractured surfaces and inputted into an integrating jig 50 which will be described later in order of cleaving. As the adhesive, an epoxy thermosetting adhesive or the like, for example, is used. Moreover, glass beads or insulating cloths functioning as a spacer are mixed in this adhesive and ensures a clearance between the magnet pieces 31 so as to bring the space between the magnet pieces 31 into an electrically insulated state.

The integrating jig 50 is provided with a fixing jig 51 having a thickness-direction fixing surface 51A, a width-direction fixing surface 51B, and a longitudinal direction fixing surface 51C. Moreover, a thickness-direction movable member 52A opposing the thickness-direction fixing surface 51A and approaching to and separated from the same and a width-direction movable member 52B opposing the width-direction fixing surface 51B and approaching to and separated from the same are provided. Moreover, a longitudinal-direction movable member 52C opposing the longitudinal-direction fixing surface 51C and approaching to and separated from the same is provided.

Between the fixing jig 51 and each of the movable members 52A to 52C, the cleft magnet pieces 31 are aligned in the cleaving order and arranged with the fractured surfaces opposing each other. That is, the thickness-direction fixing surface 51A and the thickness-direction movable member 52A are arranged in contact with upper and lower surfaces of the magnet piece 31, and the width-direction fixing surface 51B and the width-direction movable member 52B are arranged in contact with the width-direction side surfaces of the magnet piece 31. Moreover, the longitudinal-direction fixing surface 51C and the longitudinal-direction movable member 52C are arranged in contact with the longitudinal-direction end surfaces of the magnet piece 31.

Each of the movable members 52A to 52C is provided with pressing pieces 54A to 54C through springs 53A to 53C arranged on a back surface side, respectively. The thickness-direction pressing piece 54A is pressed so as to be brought into contact with an upper end of the width-direction fixing surface 51B, the width-direction pressing piece 54B with a side end of the thickness-direction fixing surface 51A, and the longitudinal-direction pressing piece 54C with a longitudinal-direction end portion of the thickness-direction fixing surface 51A, respectively. As a pressing method of each of the pressing pieces 54A to 54C, a mechanical clamp, a hydraulic pressure, a pneumatic pressure and the like are used. When each of the pressing pieces 54A to 54C is brought into contact with the end portion of each of the fixing surfaces of the above-described fixing jigs 51A to 51C, each of the movable members 52A to 52C presses the cleft magnet piece 31 by a predetermined pressing force determined by elastic forces of the springs 53A to 53C. The pressing force determined by the elastic forces of the springs 53A to 53C is set to 0.04 MPa per unit area, for example.

Here, the order of pressing by each of the pressing pieces 54A to 54C will be described.

First, by bringing the width-direction pressing piece 54B into contact with the side surface of the thickness-direction fixing surface 51A, the plurality of magnet pieces 31 are sandwiched and pressed from the width direction by the width-direction movable member 52B and the width-direction fixing surface 51B. As a result, the plurality of magnet pieces 31 are aligned in a state without a positional shift in the width direction. Since the opposing fractured surfaces of the adjacent magnet pieces 31 are surfaces formed by fracture, in the state where the plurality of magnet pieces 31 are aligned without positional shifts in the width direction, projections and recesses of the fractured surfaces correspond to each other, and intervals between the fractured surfaces become equal at any portion.

In a bonding process of the plurality of magnet pieces 31, it is known that positional shifts in the thickness direction can easily occur. Thus, in order to suppress the positional shifts in the thickness direction during pressing in the thickness direction, the positional shift in the width direction is eliminated before performing pressing in the thickness direction, so that an interval between the fractured surfaces are made equal.

Secondly, after the pressing in the width direction is released, the thickness-direction pressing piece 54A is brought into contact with the upper end of the width-direction fixing surface 51B so as to sandwich and press the plurality of magnet pieces 31 from the thickness direction by the thickness-direction movable member 52A and the thickness-direction fixing surface 51A. As a result, the plurality of magnet pieces 31 are aligned without positional shifts in the thickness direction.

The pressing in the width direction is released before pressing in the thickness direction because if pressing in the thickness direction is made while pressing in the width direction is being made, the pressing force in the width direction becomes friction in pressing in the thickness direction and prevents alignment of the magnet pieces 31.

Thirdly, by bringing the longitudinal-direction pressing piece 54C into contact with the longitudinal-direction end surface of the thickness-direction fixing surface 51A, the cleft magnet piece 31 is sandwiched and pressed from the longitudinal direction by the longitudinal-direction movable member 52C and the longitudinal-direction fixing surface 51C. As a result, the opposing fractured surfaces of the adjacent magnet pieces 31 are pressed by the spring 53C and brought into contact with each other in a state where the adhesive is interposed. Since the adhesive interposed between the fractured surfaces spreads properly between the fractured surfaces by the pressing force from the longitudinal direction, an adhesion force can be ensured. Moreover, since the magnet pieces 31 are aligned without positional shifts in the thickness direction and the width direction and bonded with the adhesive interposed in a state where the projections and recesses of the fractured surfaces correspond to each other, the adhesive makes the magnet pieces 31 adhere to each other with the equal thickness of the adhesive in any region of the fractured surfaces.

The pressing is made in the longitudinal direction while pressing is kept in the thickness direction in order to prevent bending of the magnet piece 31 at the end or warping of a row of the plurality of magnet pieces 31 in the thickness direction when pressing is made in the longitudinal direction.

Fourthly, once the pressing in the thickness direction is released, pressing is made again in the above-described thickness direction, and fifthly, the above-described pressing in the width direction is made. By performing the pressing in the thickness direction and the width direction twice, the shift can be corrected even if the positional shift occurs in the width direction or the thickness direction during first pressing in the thickness direction or pressing in the longitudinal direction.

After the magnet pieces 31 are aligned in the first to fifth procedures, they are passed through a heating furnace in a state being held by the integrating jig 50, and the temperature is raised to 150° C., for example, so as to cure the adhesive. As a result, the integrated permanent magnet 30 can be formed.

As described above, by pressing the fractured and split magnet pieces 31 by the integrating jig 50 from the three directions, that is, the thickness direction, the width direction, and the longitudinal direction, the fractured magnet pieces 31 are integrated by the adhesive while the shift between them is suppressed. Thus, when they are assembled to the slot 22 of the rotor core 21, inconvenience such as the magnet piece 31 constituting the permanent magnet 30 is caught by an edge of the slot 22 of the rotor core 21 and thus cannot be assembled to the rotor core 21 is prevented from occurring. That is, the shift between the magnet pieces 31 can be suppressed, a defective rate indicating occurrence of such defect that the permanent magnet 30 cannot be inserted into the slot of the rotor core due to the shift between the magnet pieces 31 is improved, and a yield is increased.

Moreover, the magnet dimension of the permanent magnet 30 can be made equal to the inner hollow dimension of the slot 22 of the rotor core 21. That is, as compared with a case in which a shift occurs between the magnet pieces 31, a larger permanent magnet 30 can be used, and as a result, a motor output can be improved.

Moreover, when the magnet pieces 31 are aligned by the integrating jig 50, they are pressed in the longitudinal direction lastly, and thus, when they are aligned/corrected in the thickness direction and the width direction, a friction force caused by friction between the magnet pieces 31 by the pressing force can be reduced, and the magnet pieces 31 can be easily aligned.

Furthermore, the integrating jig 50 is provided with the fixing jig 51 integrally including the thickness-direction fixing surface 51A, the width-direction fixing surface 51B, and the longitudinal-direction fixing surface 51C. Moreover, the thickness-direction movable member 52A opposing the thickness-direction fixing surface 51A and approaching to and separated from the same and the width-direction movable member 52B opposing the width-direction fixing surface 51B and approaching to and separated from the same are provided. Moreover, the longitudinal-direction movable member 52C opposing the longitudinal-direction fixing surface 51C and approaching to and separated from the same is provided. That is, since the jig is configured to be fixed on one side and movable on one side in all the three directions, the configuration can be simple, and a cost of the integrating jig 50 can be reduced.

Moreover, in the integrating jig 50, the pressing forces in the three directions, that is, the thickness direction, the width direction, and the longitudinal direction are made equal. That is, pressing is made by a longitudinal-direction load from a direction orthogonal to friction forces caused by pressing loads in the thickness direction and the width direction. Thus, even if a change occurs in the longitudinal-direction dimension of the permanent magnet 30 due to lowered viscosity caused by thermal expansion or a temperature rise of the adhesive when the temperature is raised so as to cure the adhesive, the longitudinal-direction movable member 52C can follow and move. Moreover, the clearance between the magnet pieces 31 can be controlled without destroying the spacers mixed in the adhesive, and the whole length dimension of the permanent magnet 30 can be contained in a desired dimension. Furthermore, the adhesive properly spreads between the fractured surfaces by the pressing made in the longitudinal direction, and the adhesion force can be ensured.

Instead of the pressing order described above, the order may be such that the pressing is made first in the width direction, then, pressing is made in the thickness direction while the pressing in the width direction is kept as it is, and lastly the pressing is made in the longitudinal direction while the pressing in the width direction and the thickness direction is kept as it is. In this case, the pressing force in the width direction becomes friction when pressing in the thickness direction is made, but since the positional shift in the width direction by the pressing in the thickness direction can be suppressed, pressing in the width direction and the thickness direction can be kept to once, respectively.

Figure 12:
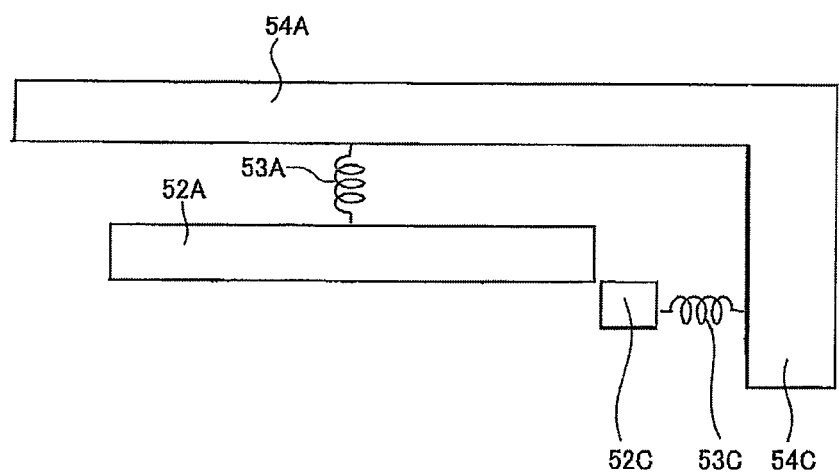
FIG. 12 is a cross sectional diagram illustrating a configuration of another example of the integrating jig according to the first embodiment.

Any two of the width-direction pressing piece 54B, the thickness-direction pressing piece 54A, and the longitudinal-direction pressing piece 54C may be formed integrally. For example, as illustrated in FIG. 12, if the thickness-direction pressing piece 54A is formed integrally with the longitudinal-direction pressing piece 54C, the pressing is made in the longitudinal direction while pressing is being made in the thickness direction. As described above, by forming any two of the pressing pieces integrally, the number of components can be reduced. Moreover, since one contact surface between the pressing pieces is eliminated by forming the two pressing pieces integrally, burdens of dimension management and machining processing of the contact surface is reduced. It is needless to say that the similar effect can be obtained by forming the width-direction pressing piece 54B and the longitudinal-direction pressing piece 54C or the thickness-direction pressing piece 54A and the width-direction pressing piece 54B integrally.

Figure 5A:
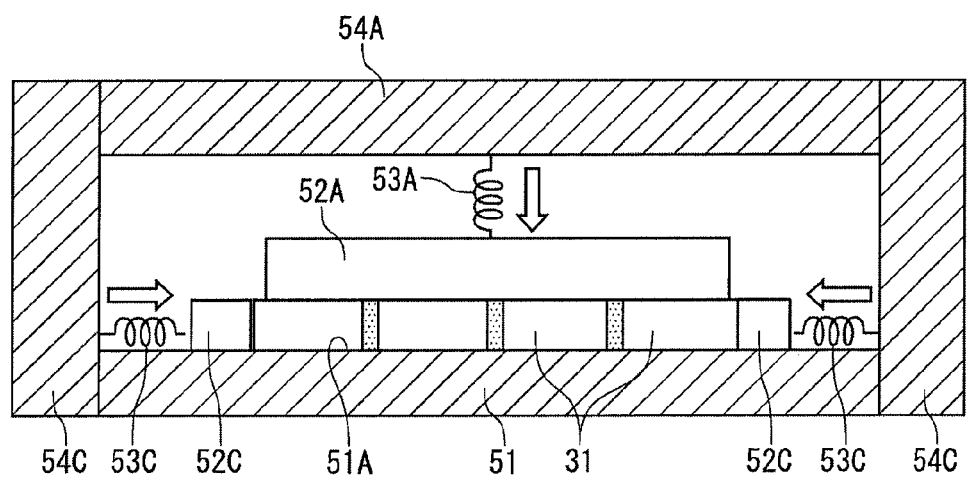
FIG. 5A is a cross sectional diagram illustrating a configuration of an integrating jig of a second embodiment.
Figure 5B:
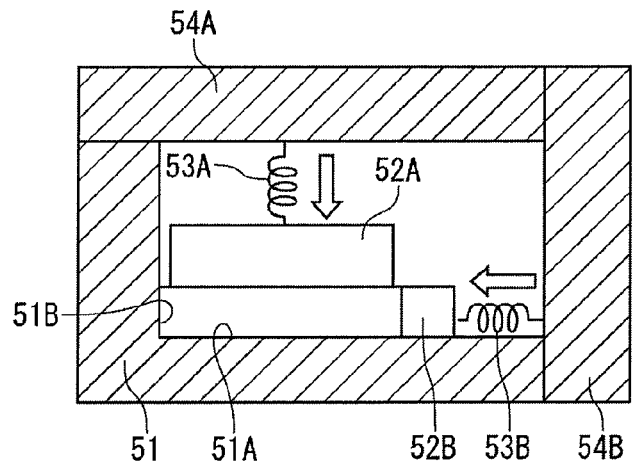
FIG. 5B is a longitudinal sectional diagram illustrating a configuration of the integrating jig of the second embodiment.

FIGS. 5A and 5B illustrate a configuration of a second embodiment of the integrating jig 50. In the integrating jig 50 of this embodiment, the longitudinal-direction movable member 52C in the integrating jig 50 of the first embodiment is arranged on the both end surfaces in the longitudinal direction with respect to the plurality of magnet pieces 31. That is, this integrating jig 50 is provided with the fixing jig 51 having the thickness-direction fixing surface 51A and the width-direction fixing surface 51B integrally. Moreover, the thickness-direction movable member 52A opposing the thickness-direction fixing surface 51A and approaching to and separated from the same and the width-direction movable member 52B opposing the width-direction fixing surface 51B and approaching to and separated from the same are provided similarly to the first embodiment. Also, a pair of the longitudinal-direction movable members 52C opposing and approaching to and separated from are provided along the longitudinal-direction of the fixing jig 51, which is different from the first embodiment.

Each of the longitudinal-direction movable members 52C is provided with the pressing piece 54C through the spring 53C arranged on the back surface side, respectively, and each of the pressing pieces 54C is pressed so as to be brought into contact with the longitudinal-direction end portion of the thickness-direction fixing surface 51A from the back surface. As a pressing method of the pressing piece 54C, a mechanical clamp, a hydraulic pressure, a pneumatic pressure and the like are used. When each of the pressing pieces 54C is brought into contact with the both end surfaces in the longitudinal direction of the applicable fixing jig 51, the cleft magnet piece 31 is pressed from the both ends by a predetermined pressing force determined by an elastic force of the spring 53C by the longitudinal-direction movable member 52C through the spring 53C, respectively. The pressing force determined by the elastic force of the springs 53C is set to 0.04 MPa per unit area, for example. The other configurations are similar to that of the first embodiment.

In the integrating jig 50 of this embodiment, pressing is made by the longitudinal-direction load from the both sides in a direction orthogonal to the friction force by the pressing loads in the thickness direction and the width direction. Thus, even if a change occurs in the longitudinal-direction dimension of the permanent magnet 30 due to lowered viscosity caused by thermal expansion or a temperature rise of the adhesive when the temperature is raised so as to cure the adhesive, the movable member 52C on the both ends in the longitudinal direction can follow and move. Thus, weakening of the pressing force in the longitudinal direction with the movement from the movable member 52C side to the fixing surface side due to an influence of the friction force of pressing in the width direction and the thickness direction of the permanent magnet 30 can be solved. As a result, a concern that the spread of the adhesive decreases on the fixing jig 51 side and the adhesion force lowers can be solved. In other words, by applying the longitudinal-direction pressing force from the longitudinal-direction movable members 52C on the both ends, deterioration of the longitudinal-direction pressing force due to the influence of the friction force by pressing in the width direction and the thickness direction of the permanent magnet 30 can be suppressed. Thus, lowering of the adhesion force between the magnet pieces 31 can be suppressed, and a uniform adhesion force can be obtained between the magnet pieces 31. Since the uniform adhesion force can be obtained, the clearance between the magnet pieces 31 can be uniformly controlled without destroying the spacers mixed in the adhesive, and the whole length dimension of the permanent magnet 30 can be contained in a desired dimension. Moreover, as the adhesive properly spreads between the fractured surfaces by the uniform pressing in the longitudinal direction, the adhesion force can be ensured.

Figure 6:
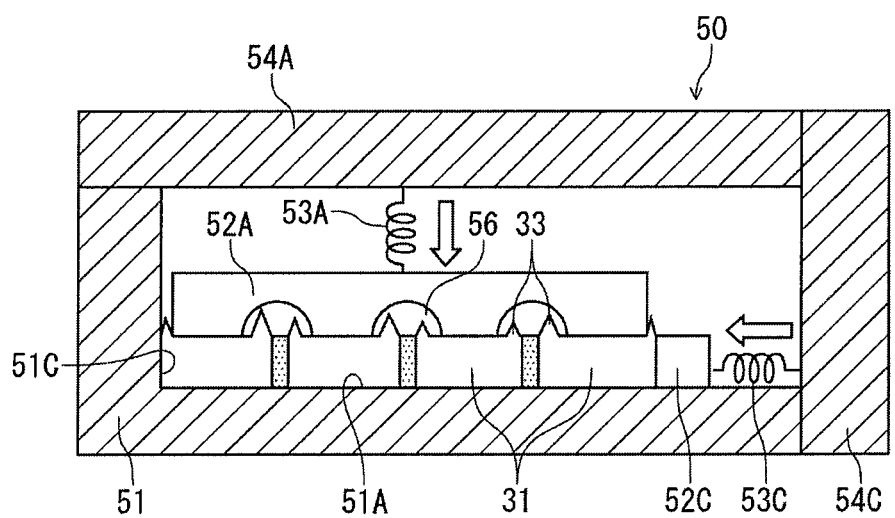
FIG. 6 is a cross sectional diagram illustrating a configuration of an integrating jig of a third embodiment.
Figure 7:
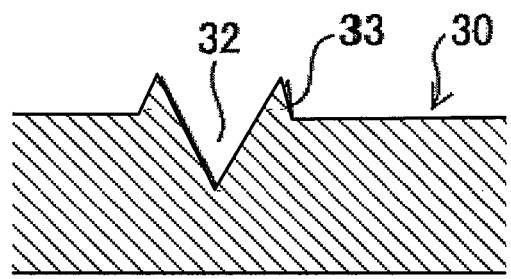
FIG. 7 is a side view of a groove portion provided in the permanent magnet before cleaving.

FIG. 6 illustrates a configuration of a third embodiment of the integrating jig 50. The integrating jig 50 of this embodiment aligns and integrates the magnet pieces 31, each provided with a projection 33 projecting in the thickness direction along the fractured surface. The projection 33 in the thickness direction along the fractured surface of the magnet piece 31 is generated if the groove 32 given in advance in order to cleave the permanent magnet 30 is provided by laser machining as in FIG. 7. That is, by the method using laser beam irradiation, sharpness of a distal end of the notch groove 32 can be made sharper, facilities to be used are inexpensive, and a running cost can be also lowered. However, with the method using laser beam irradiation, a volume of the groove 32 to be provided in the magnet surface, that is, a material of a region molten as the notch groove is pushed out, accumulated and adheres to the both sides of the notch groove 32. Thus, burrs are eventually generated on the magnet surface on the both sides of the notch groove 32 by the accumulated and adhering material.

Figure 8:
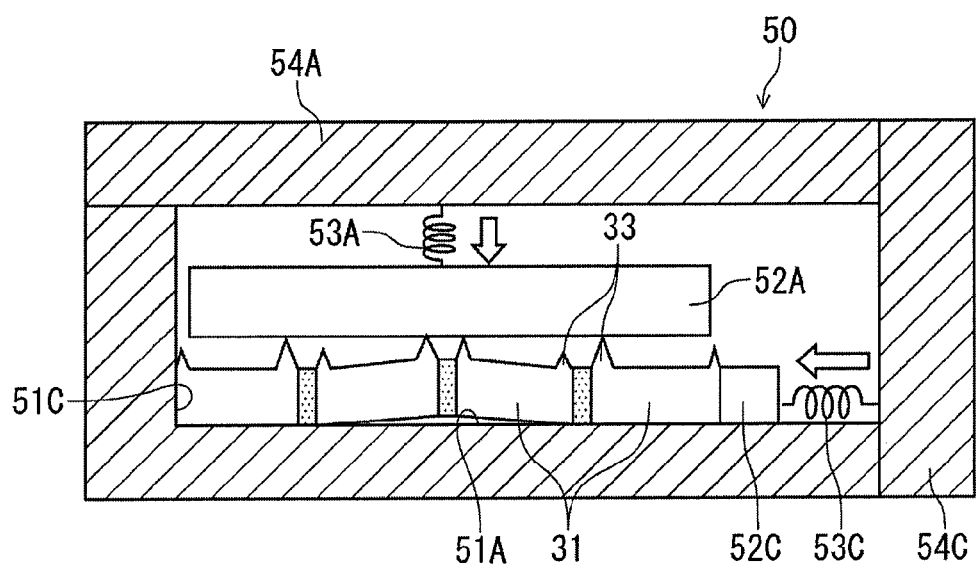
FIG. 8 is a cross sectional diagram illustrating a configuration of an integrating jig of a comparative example.

With the projection 33 present on the magnet piece 31, if the integrating jig 50 illustrated in the first and second embodiments is applied, even if the jig is pressed by the thickness-direction movable member 52A, the magnet pieces 31 cannot be aligned by the presence of the projection 33 as illustrated in FIG. 8. That is, since the thickness-direction movable member 52A does not touch the surface of each magnet piece 31 but touches only the distal end of the projection 33, the magnet pieces 31 cannot be reliably brought into contact with the thickness-direction fixing surface 51A, and the shift in the thickness direction between the magnet pieces 31 cannot be completely corrected.

Then, in the integrating jig 50 of this embodiment, a groove 56 for accommodating the projection 33 is formed in the surface of the thickness-direction movable member 52A opposite the projection 33 of the magnet piece 31 as illustrated in FIG. 6. This groove 56 has such a depth that the distal end of the projection 33 does not touch the groove bottom when the projection 33 is accommodated. Moreover, the width of the groove 56 has such a dimension that the projection 33 does not touch the side wall of the groove 56 even during movement of the projection 33 with the longitudinal-direction movement of the magnet piece 31 such as the spread of the adhesive by pressing the magnet piece 31 from the longitudinal direction by the longitudinal-direction movable member 52C, expansion when the adhesive is cured and the like. The other configurations are formed similarly to those of the integrating jig 50 in the first and second embodiments.

According to such integrating jig 50, a plane portion excluding the groove 56 of the thickness-direction movable member 52A touches the surface excluding the projection 33 of the magnet piece 31 and can align the magnet pieces 31 in the thickness direction without a shift between itself and the thickness-direction fixing surface 51A. Moreover, the longitudinal-direction movement of the magnet piece 31 made during the spread of the adhesive by pressing of the magnet piece by the longitudinal-direction movable member 52C from the longitudinal-direction, the expansion when the adhesive is cured and the like caused by pressing on the magnet piece 31 by the longitudinal-direction movable member 52C from the longitudinal direction can be allowed without interference by the projection 33.

The projection 33 on the surface of the permanent magnet 30 is removed by mechanical machining at once after the adhesive is cured. By removing the projection 33 after the magnet piece 31 is integrated as above, shape accuracy of the permanent magnet 30 can be improved more easily than a case in which the projections 33 are removed individually for the magnet pieces 31 and shaped before integration. Moreover, since the shape accuracy is improved and the variation in the shape is reduced as above, the dimension of the permanent magnet 30 can be made larger, and as a result, contribution can be made to improvement of the motor output.

Moreover, provision of the groove 56 for accommodating the projection 33 on the surface of the thickness-direction movable member 52A was described, but instead, the groove 56 for accommodating the projection 33 may be provided on the thickness-direction fixing surface 51A.

In this embodiment, the effects described below can be exerted.

(A) This is a manufacturing device for the permanent magnet 30 to be embedded in the rotor core of the rotating electrical machine in which a plurality of the magnet pieces 31, each formed by being fractured and split along the notch groove 32, are aligned and joined to each other by using an adhesive interposed between the fractured surfaces. First pressing means for aligning the plurality of magnet pieces 31 with the fractured surfaces opposed to each other in the width direction by pressing the magnet pieces from the width direction of the permanent magnet 30, and second pressing means for aligning the plurality of magnet pieces 31 in the thickness direction by pressing the magnet pieces from the thickness direction of the permanent magnet 30 are provided. Furthermore, third pressing means for joining the opposing fractured surfaces of the magnet pieces 31 with the interposed adhesive by pressing the plurality of magnet pieces 31 from the longitudinal direction of the permanent magnet 30 is provided. Thus, since the plurality of magnet pieces 31 can be pressed and aligned in the thickness direction, the width direction, and the longitudinal direction, the shift between the magnet pieces 31 can be suppressed. As a result, the defective rate indicating occurrence of a defect that the permanent magnet 30 cannot be inserted into the slot 22 of the rotor core 21 due to the shift between the magnet pieces 31 is improved, and a yield is increased. Moreover, since the shift between the magnet pieces 31 can be suppressed, the magnet dimension can be ensured large as a result, and contribution can be made to improvement of the motor output.

(B) Since each of the pressing means 54A to 54C presses the plurality of magnet pieces 31 onto the fixed jig surface by the movable members 52A to 52C so as to align the plurality of magnet pieces 31 and join the fractured surfaces to each other, the means is configured to be fixed on one side and movable on one side in all the three directions, the configuration can be simple, and a cost of the integrating jig 50 can be reduced.

(C) Since each of the pressing means 54A to 54C presses the magnet piece 31 with an equal pressing load, even if a change occurs in the longitudinal-direction dimension of the permanent magnet 30 due to lowered viscosity caused by thermal expansion or a temperature rise of the adhesive when the temperature is raised so as to cure the adhesive, the longitudinal-direction movable member 52C can follow and move.

(D) Each of the magnet pieces 31 is provided with the projection 33 on one of the surfaces in the thickness direction along the fractured surface, and the second pressing means 54A is provided with the groove 56 for accommodating the projection 33 at a portion faced with the projection 33 of each magnet piece 31. Thus, the plane portion excluding the groove 56 of the thickness-direction movable member 52A touches the surface excluding the projection 33 of the magnet piece 31 and can align the magnet pieces 31 in the thickness direction without a shift between itself and the thickness-direction fixing surface 51A. Moreover, the longitudinal-direction movement of the magnet piece 31 made during the spread of the adhesive by pressing of the magnet piece 31 by the longitudinal-direction movable member 52C from the longitudinal-direction, the expansion when the adhesive is cured and the like can be allowed without interference by the projection 33.

(E) The first and second pressing means 54B and 54A press the plurality of magnet pieces 31 to the fixed jig surface by the movable members 52B and 52A so as to align the plurality of magnet pieces 31, and the third pressing means 54C presses the plurality of magnet pieces 31 from the both sides by the movable members 52C arranged on the both sides in the longitudinal direction of the permanent magnet 30 and joins the opposing fractured surfaces of the magnet pieces with the interposed adhesive. That is, by applying the longitudinal-direction pressing force from the longitudinal-direction movable members 52C at the both ends, lowering of the longitudinal-direction pressing force due to the influence of the friction force of the pressing in the width direction and the thickness direction of the permanent magnet 30 can be suppressed, lowering of the adhesion force between the magnet pieces 31 can be suppressed, and a uniform adhesion force can be obtained between the magnet pieces 31. Thus, the clearance between the magnet pieces 31 can be uniformly controlled without destroying the spacers mixed in the adhesive, and the whole length dimension of the permanent magnet 30 can be contained within a desired dimension. Moreover, as the adhesive properly spreads between the fractured surfaces by the uniform pressing in the longitudinal direction, the adhesion force can be ensured.

(F) This is a manufacturing method of the permanent magnet 30 to be embedded in the rotor core of the rotating electrical machine in which a plurality of the magnet pieces 31, each formed by being fractured and split along the notch groove 32, are aligned and joined to each other with an adhesive interposed between the fractured surfaces. First pressing process for aligning the plurality of fractured and split magnet pieces 31 with the fractured surfaced opposed to each other in the thickness direction by pressing the magnet pieces 31 from the thickness direction of the permanent magnet 30, and second pressing process for aligning the plurality of magnet pieces 31 in the width direction by pressing the magnet pieces 31 from the width direction of the permanent magnet 30 are provided. Furthermore, third pressing process for joining the opposing fractured surfaces of the magnet pieces 31 with the interposed adhesive by pressing the plurality of magnet pieces 31 aligned by the first and second pressing process from the longitudinal direction of the permanent magnet 30 is provided. In other words, when the magnet pieces 31 are to be aligned by the integrating jig 50, since the magnet pieces are pressed in the longitudinal direction lastly, the friction force caused by rubbing between the magnet pieces 31 by the pressing force can be reduced during alignment / correction in the thickness direction and the width direction, and the magnet pieces 31 can be easily aligned.

(Second Embodiment)

Figure 9:
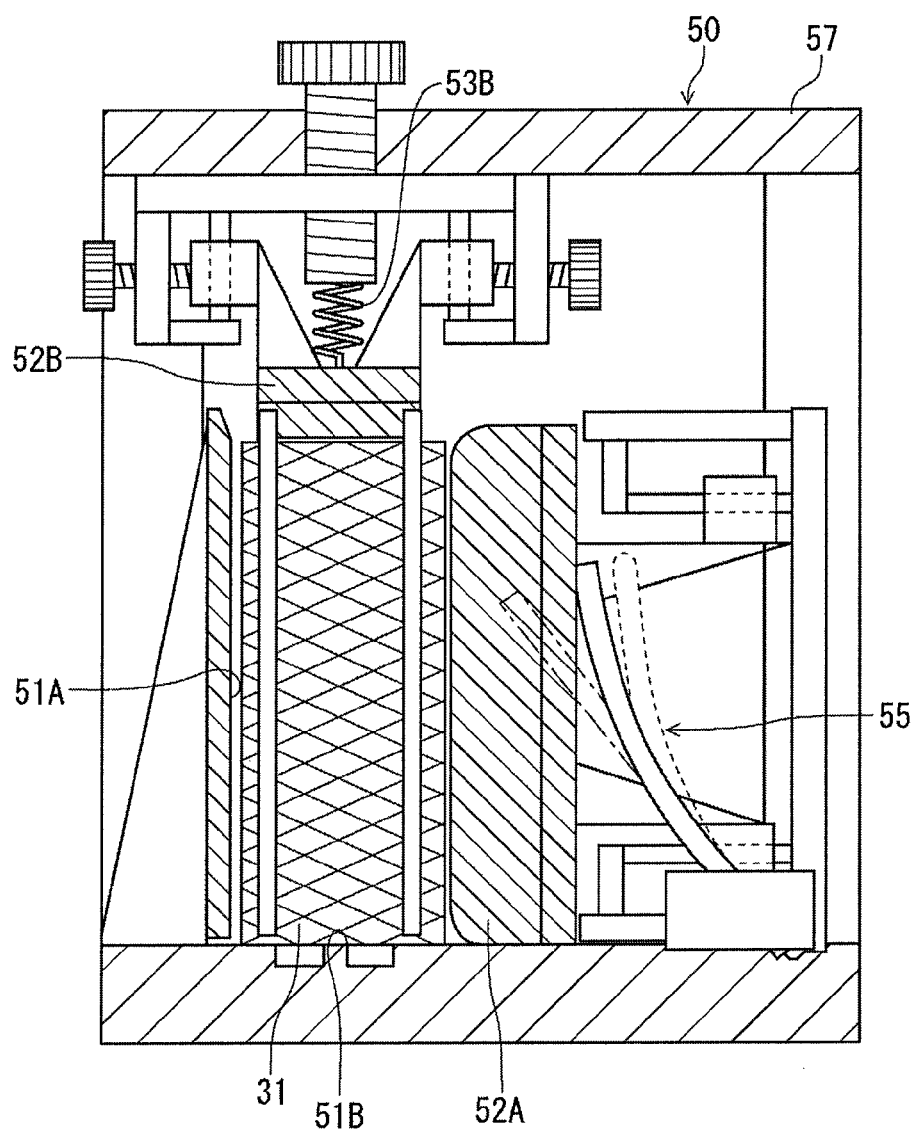
FIG. 9 is a longitudinal sectional diagram illustrating the configuration of an integrating jig according to the second embodiment of the present invention.
Figure 10A:
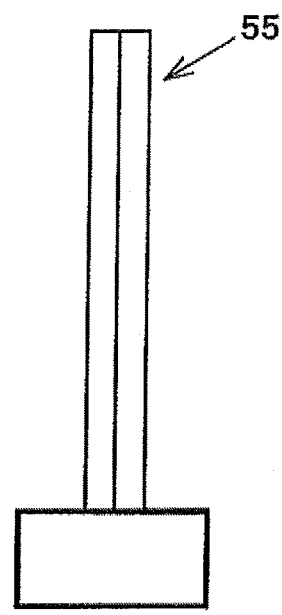
FIG. 10A is a diagram illustrating a shape of a plate spring at a normal temperature.
Figure 10B:
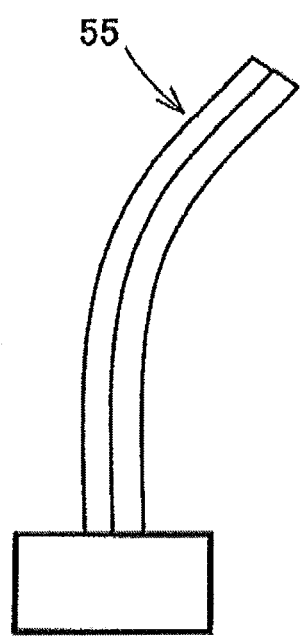
FIG. 10B is a diagram illustrating a shape of a plate spring at a raised temperature.
Figure 11:
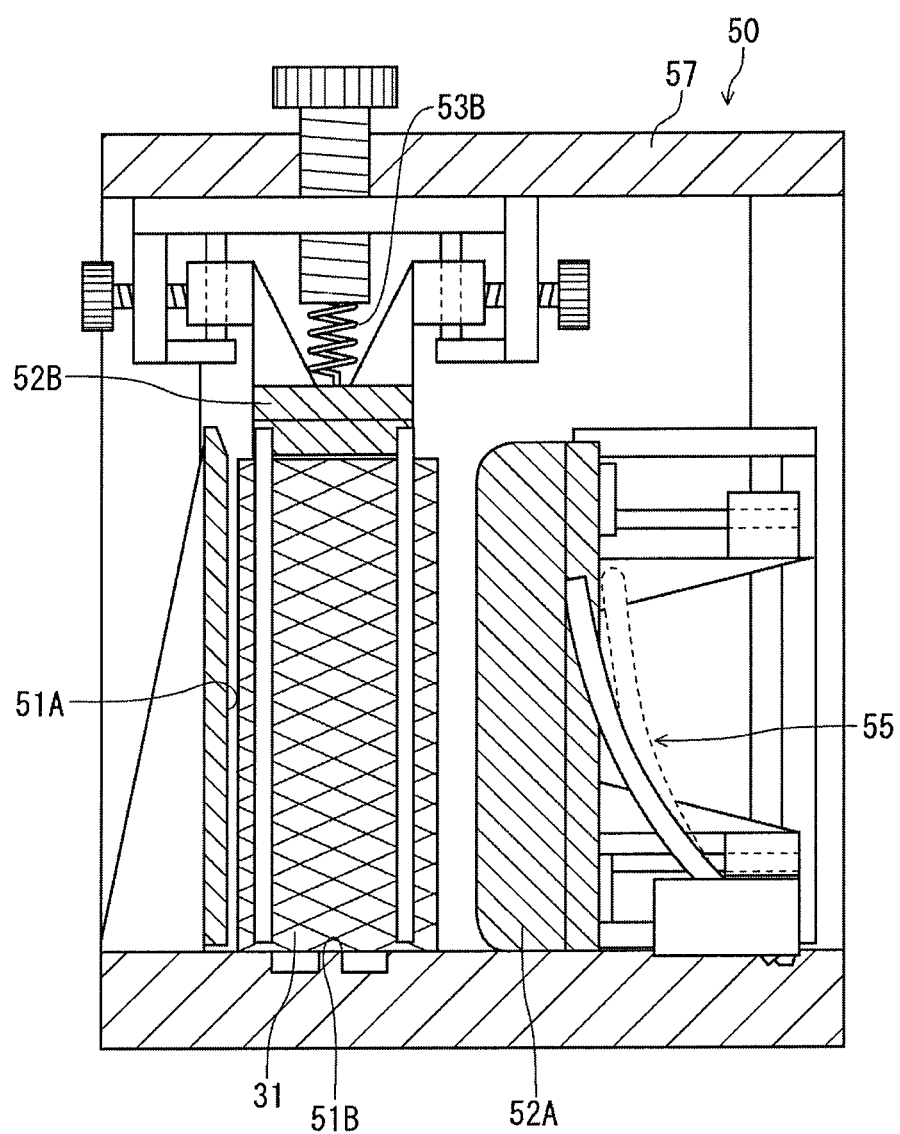
FIG. 11 is a longitudinal sectional diagram illustrating an operation of the integrating jig according to the second embodiment at the raised temperature.

FIGS. 9 to 11 illustrate a second embodiment of a manufacturing device for a permanent magnet to be embedded in a rotor core of a rotating electrical machine to which the present invention is applied and a manufacturing method of the same. That is, FIG. 9 is a side view of an integrating jig, FIG. 10 is an explanatory diagram of a spring device used in the integrating jig, and FIG. 11 is a side view of an operation state of the integrating jig. In this embodiment, a configuration in which the pressing force to be imparted to at least either one of the thickness-direction movable member 52A and the width-direction movable member 52B is changed in accordance with an atmospheric temperature is added to the first embodiment. The same devices as those in the first embodiment are given the same reference numerals and the description will be omitted or simplified.

In the integrating jig 50 in this embodiment, the pressing force to be imparted to at least one of the thickness-direction movable member 52A and the width-direction movable member 52B is changed in accordance with the atmospheric temperature. That is, at a normal temperature when the atmospheric temperature is low, a predetermined pressing force or a load of 0.04 MPa per unit area, for example, is generated. As the atmospheric temperature rises, the pressing force is lowered, and at a curing temperature of the adhesive or an atmospheric temperature raised to 150° C., for example, the pressing force is lowered to near zero.

The integrating jig 50 illustrated in FIG. 9 is formed of a framework frame 57. The width direction of the magnet piece 31 is arranged in the vertical direction in the figure, the frame 57 as the fixing jig 51 is arranged on one side of the vertical direction (the lower side in FIG. 9), while the width-direction movable member 52B is arranged on the other side (the upper side in FIG. 9) movably in the vertical direction by being guided by a vertical-direction slider. The width-direction movable member 52B is arranged so as to press downward in the figure by a coil spring 53B whose base portion is fixed to an adjusting bolt screwed to the frame 57.

Moreover, the thickness direction of the magnet piece 31 is arranged in the horizontal direction in the figure, and the thickness-direction fixing surface 51A as the fixing jig 51 is arranged on one side in the horizontal direction (the left side in FIG. 9), while the thickness-direction movable member 52A is arranged on the other side (the right side in FIG. 9) movably in the horizontal direction by being guided by a horizontal-direction slider. The thickness-direction movable member 52A is arranged so as to press leftward in the figure by a plate spring 55 formed of a bimetal 55 whose base portion is fixed to the frame 57.

The plate spring 55 is formed by joining two plate materials having different linear expansion coefficients and has a linear shape in a normal-temperature state as illustrated in FIG. 10A. When the temperature is raised, the plate spring is deformed into a curved shape due to the difference in a thermal expansion amount between the two plate materials as illustrated in FIG. 10B. In a state where the magnet piece 31 is sandwiched by the fixing jig 51 and the movable member 52A, the base portion of the plate spring 55 is fixed to the frame 57 in a state where the thickness-direction movable member 52A is elastically deformed so as to apply a load of 0.04 MPa per unit area at a normal temperature. As a result, in the normal-temperature state, the bimetal 55 can constrain the magnet piece 31 through the movable member 52A by the above-described pressing force.

The bimetal 55 described by a one-dot chain line in FIG. 9 has a shape in a natural state where no external force is applied, while the bimetal 55 described by a broken line in FIG. 9 has a shape when the atmospheric temperature is raised to a curing temperature of the adhesive or 150° C., for example.

As a setting example of the bimetal 55, the bimetal 55 having JIS corresponding number TM3 and a rectangular section with a plate thickness of 1 mm, a plate width of 5 mm, and a whole length of 50 mm, for example, will be described. In this bimetal 55, assuming that the thickness-direction pressing load is at 0.04 MPa per unit area, a maximum deflection amount of the plate material is 2.96 mm. In this case, the plate material is fixed to the frame so that the deflection amount of the plate material obtained by pressing the magnet piece 31 by the movable jig becomes 2.96 mm.

The fixing jig 51 and the movable member 52C in the longitudinal direction of the magnet piece 31 are not shown but formed similarly to those in the first embodiment. Moreover, in the above-described integrating jig 50, only the thickness-direction movable member 52A is described as regulating the thickness direction of the magnet piece 31 by the bimetal 55. However, the width-direction movable member 52B may also regulate the width direction of the magnet piece 31 by the bimetal 55.

As described above, in the integrating jig 50 of this embodiment, in a state where the magnet piece 31 is set in the integrating jig 50 and the adhesive has not been cured yet, the thickness-direction position and/or the width-direction position between the magnet pieces 31 can be constrained and reliably aligned by a large pressing force set by the bimetal 55.

Then, during the temperature rise so as to cure the adhesive, the atmospheric temperature is raised from a normal temperature at 20° C. to 150° C., and the adhesive is cured with the temperature rise. Moreover, the bimetal 55 is deformed from a state indicated by a broken line to a state indicated by a solid line in FIG. 11 in accordance with the rise of the atmospheric temperature. Thus, the pressing force by the bimetal 55 gradually decreases, and the friction force between the magnet pieces 31 caused by the pressing forces by the thickness-direction movable member 52A and the width-direction movable member 52B and these jigs gradually decreases. On the other hand, under the pressing force by the longitudinal-direction movable member 52C, the magnet pieces 31 are to move in the longitudinal direction by thermal expansion of the adhesive.

Then, the lowered friction force lowers transfer resistance between the magnet pieces 31 and these jigs, and in the magnet pieces 31, the pressing force by the longitudinal-direction movable member 52C starts acting uniformly between the magnet pieces 31. Thus, destruction of the spacers in the adhesive caused by an action of a strong compression load to a part of the adhesive between the fractured surfaces is prevented, and reduction of a clearance between the magnet pieces 31 is suppressed. As a result, inconvenience that the adhesive does not properly spread between the fractured surfaces and the adhesion force lowers is suppressed. Thus, the clearance between the fractured surfaces can be controlled uniformly, and the whole length dimension of the permanent magnet 30 can be contained within a desired dimension. Furthermore, since the inconvenience that the adhesive does not properly spread between the fractured surfaces and the adhesion force lowers is solved, a uniform adhesion force can be obtained between the magnet pieces 31.

If the thickness-direction pressing load and the width-direction pressing load do not change with the rise of the atmospheric temperature, the above-described friction force does not lower even by the rise of the atmospheric temperature, and thus, transfer resistance of the magnet piece 31 does not lower, either. In this case, the magnet piece 31 cannot follow or move with the thermal expansion of the adhesive. Therefore, inconveniences such as the spacers contained in the adhesive are crushed and the clearance between the magnet pieces 31 is made smaller, and the lowering of the adhesion force due to the adhesive not properly spread between the fractured surfaces with a weak compression load are expected when a strong compression load acts between the fractured surfaces located on the fixing jig 51 side.

However, in this embodiment, since the transfer resistance lowers with the temperature rise, and the magnet pieces 31 can follow and move with the thermal expansion of the adhesive, as described above, the inconvenience such as a decrease in the clearance between the magnet pieces 31 caused by crushing of the spacers contained in the adhesive between the fractured surfaces located on the fixing jig 51 side and lowering of the adhesion force due to the adhesive not properly spreading between the fractured surfaces can be solved.

In this embodiment, in addition to the effects (A) to (F) in the first embodiment, the effects discussed below can be exerted.

(G) At least either one of the first and second pressing means 54B and 54A aligns the plurality of magnet pieces 31 by pressing the plurality of magnet pieces 31 by the movable members 52A and 52B to the fixed jig surface by the pressing force lowering in accordance with the rise of the atmospheric temperature. Thus, the transfer resistance lowers with the temperature rise, the magnet pieces 31 can follow and move with the thermal expansion of the adhesive, and the inconveniences such as a decrease in the clearance between the magnet pieces 31 caused by crushing of the spacers contained in the adhesive between the fractured surfaces located on the fixing jig 51 side and lowering of the adhesion force due to the adhesive not properly spreading between the fractured surfaces can be solved.

The embodiments of the present invention have been described but the above-described embodiments illustrate only a part of application examples of the present invention and are not intended to limit a technical scope of the present invention to specific configurations of the above-described embodiments. For example, the permanent magnet embedded rotating electrical machine was described in the above-described embodiments, but the present invention can be also applied to a so-called SPM motor in which the permanent magnet is bonded on the rotor outer peripheral surface.

This application claims for priority on the basis of Japanese Patent Application No. 2010-138253 filed with Japan Patent Office on Jun. 17, 2010 and all the contents of this application is incorporated in this description by reference.

Reference Signs List

A permanent magnet embedded rotating electrical machine
10 stator
20 rotor
21 rotor core
22 slot
30 permanent magnet
31 magnet piece
32 recess groove
33 projection
50 integrating jig
51A thickness-direction fixing surface
51B width-direction fixing surface
51C longitudinal-direction fixing surface
52A thickness-direction movable member
52B width-direction movable member
52C longitudinal-direction movable member
53 spring
54A thickness-direction pressing piece (second pressing means)
54B width-direction pressing piece (first pressing means)
54C longitudinal-direction pressing piece (third pressing means)
55 plate spring, bimetal
56 groove

The invention claimed is:

1. A manufacturing method of a permanent magnet disposed in a rotating electrical machine in which a plurality of magnet pieces formed by being fractured and split along a notch groove are aligned and joined to each other with an adhesive interposed between fractured surfaces, comprising:
   a first pressing step of aligning the plurality of fractured and split magnet pieces in a width direction with the fractured surfaces opposing each other by pressing from the width direction of the permanent magnet;
   a second pressing step of aligning the plurality of magnet pieces in a thickness direction by pressing from the thickness direction of the permanent magnet after the first pressing step; and
   a third pressing step of pressing the plurality of magnet pieces aligned in the first and second pressing steps and joining the opposing fractured surfaces of the magnet pieces with an interposed adhesive.

2. The manufacturing method of a permanent magnet according to claim 1, wherein
   the second pressing process is performed in a state where the pressing by the first pressing process is released.

* * * * *